Patented Aug. 18, 1936

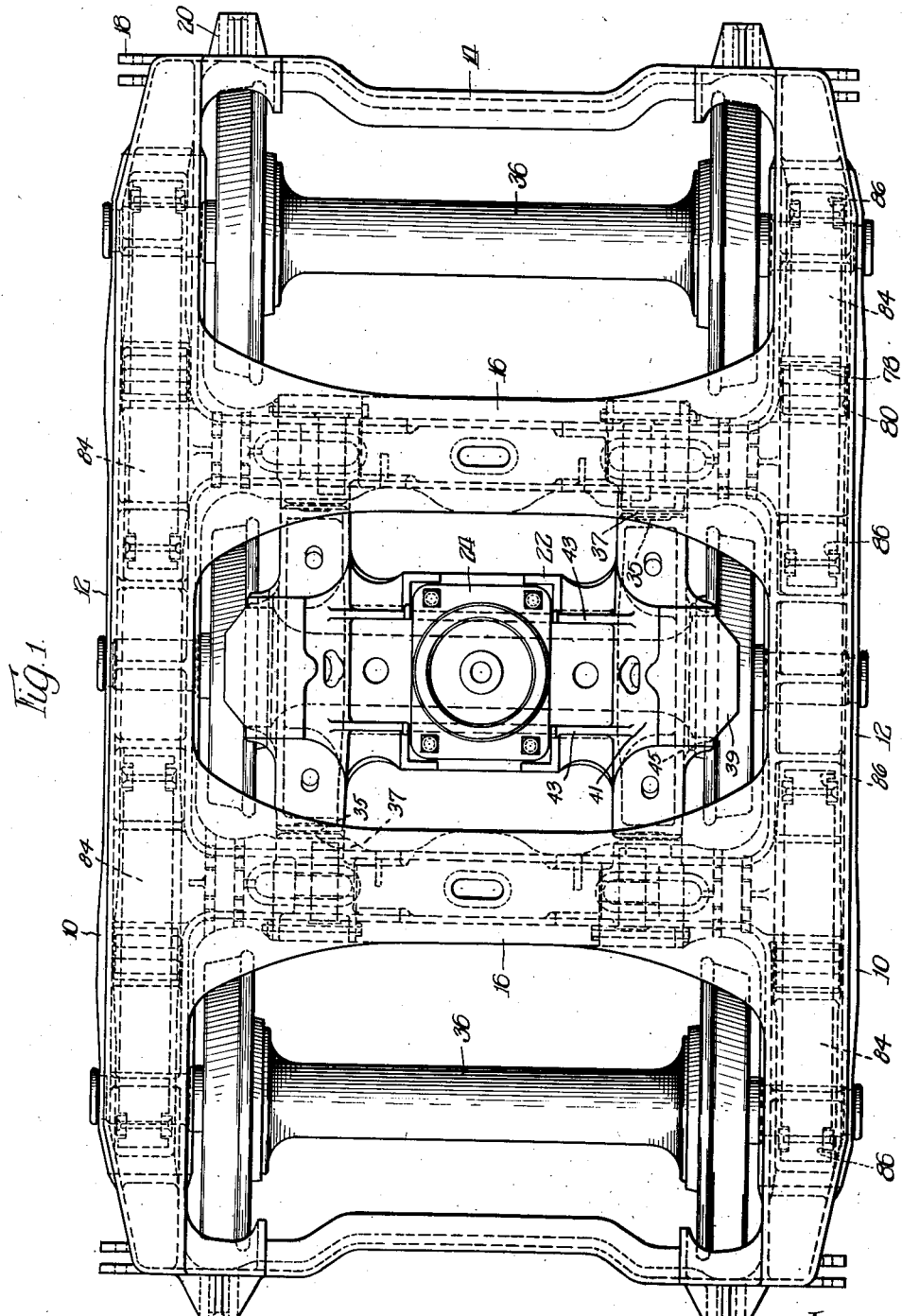

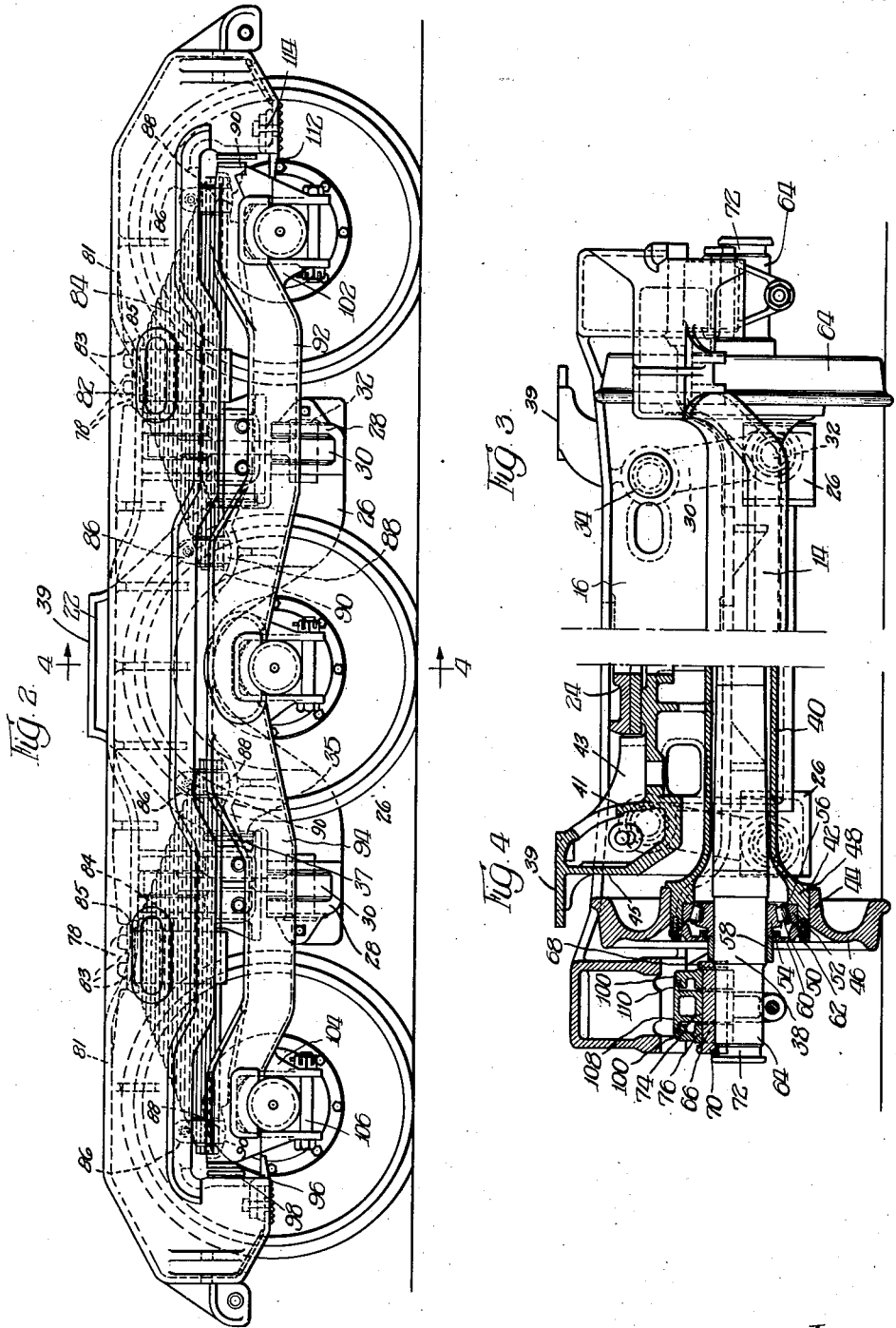

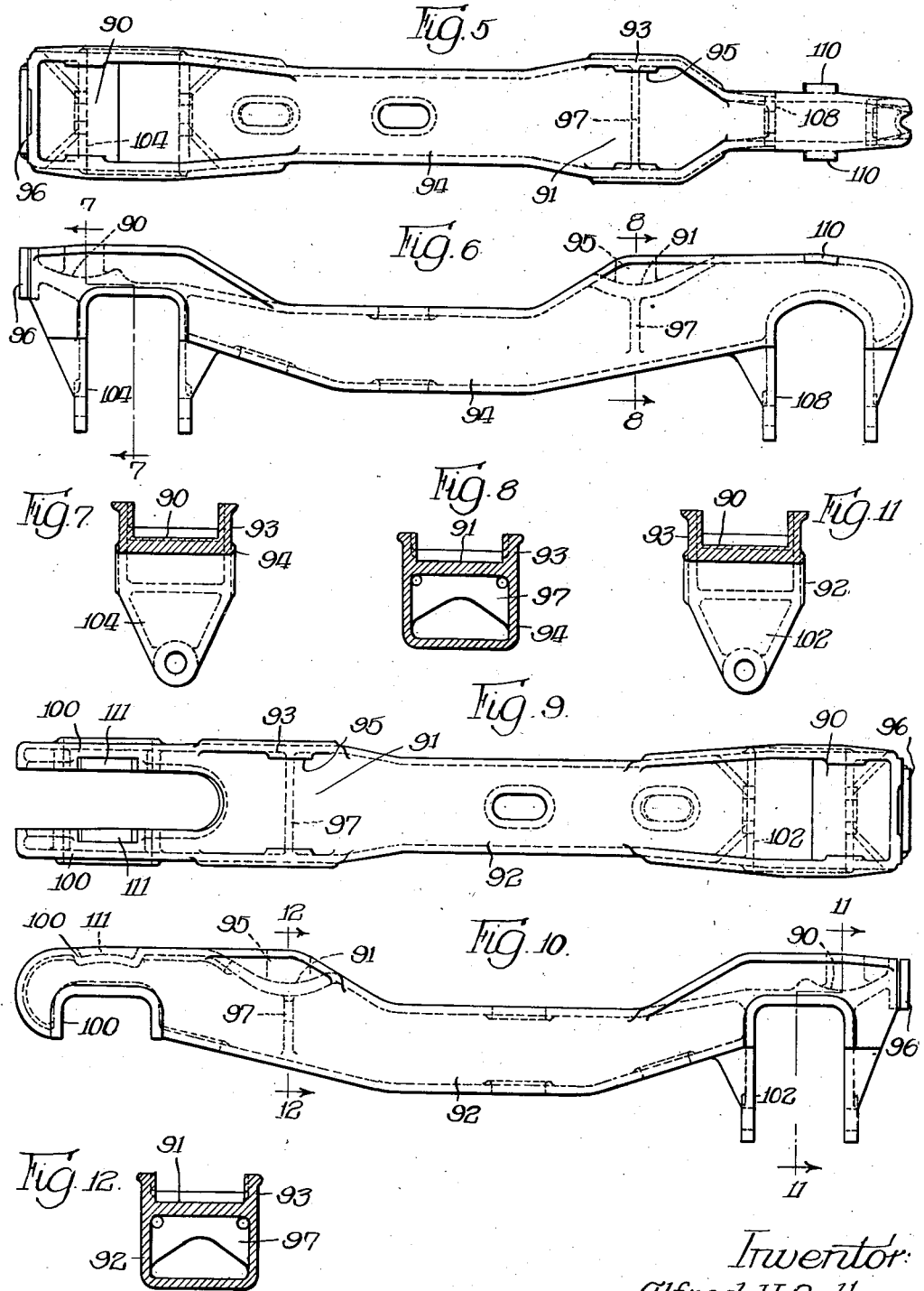

2,051,646

UNITED STATES PATENT OFFICE 2,051,646

TRUCK

Alfred H. Oelkers, Chicago, Ill., assignor to American Steel Foundries, Chicago, Ill., a corporation of New Jersey Application May 18, 1929, Serial No. 364,023

49 Claims. (Cl. 105—195)

This invention pertains to railway trucks, and more particularly to six wheel trucks for railway cars embodying the use of anti-friction wheel and axle assemblies.

The six wheel trucks now used on railroads have a great number of wearing parts, the maintenance of which during the service life of the truck entails large expenditures. These parts which have the greatest tendency to wear out in service are bearings, axles, journal boxes, frame pedestal jaws, springs, equalizers, and equalizer fulcrums. When the usual standard friction bearings are used in journal boxes on the ends of the axles, it is necessary to transmit the weight from the journal box to the bearing through a crown surface in order to permit the journal box to rock slightly when functioning in the frame pedestal jaws without shifting the weight on the bearing from one end to the other.

With the introduction of roller bearing assemblies, it was found unnecessary to maintain the use of the journal box at the end of the axle because the necessity for keeping the weight evenly distributed on the journal end had been diminished or eliminated, and it was furthermore found unnecessary to provide means for carrying the waste and lubricant at this point. This omission of the journal box likewise eliminates the need for pedestals in the main truck frame, which pedestals are used primarily to guide the journal box on the journal and transmit the lateral thrust to the journal bearing.

It is therefore an object of this invention to provide a truck in which anti-friction bearings are used wherein it is possible to take advantage of all the changes that might be made in the truck as a result of the use of said anti-friction bearings.

Another object is to eliminate the pedestal jaws which transmit the lateral thrust from the center plate to the wheel flanges in order to eliminate wear due to the relative movement between the truck frame and the wheels during the time that the lateral thrust is in action.

Yet another object is to provide an improved truck frame of a construction wherein the machine work usually required will be materially reduced.

A further object is to provide a truck construction which while providing for vertical movement of the truck frame in relation to the wheels while transmitting the lateral thrust, still is constructed so that no part of the main truck frame bears or chafes against any part of the assembly which runs in unison with the wheel and axle assemblies.

A still further object is to provide a truck construction provided with semi-elliptic springs which transmit the vertical loads and the horizontal longitudinal and lateral thrusts to the wheel and axle assemblies without the use of wearing parts, such as pedestal jaws.

A yet further object is to provide a truck construction of the six wheel type wherein the usual complex equalizing system is materially simplified and its efficiency and function increased.

A different object is to provide a truck provided with an equalizing system which completely functions and is efficient regardless of the wheel base of said truck.

A still different object of this invention is to provide a truck construction of the six wheel type which will permit the middle wheels of the truck to follow the curvature of the rail and at the same time equalize horizontal thrusts from the bolster against all of the wheel flanges.

A yet different object of this invention is to provide a truck construction utilizing anti-friction wheel and axle assemblies and wherein resilient equalizing members are used.

An important object is to provide a truck construction provided with semi-elliptic springs so disposed that the vertical and horizontal loads are jointly and resiliently transmitted from the truck frame to the axles.

A different important object is to provide a railway truck construction provided with roller bearings wherein the equalizers receive their loading from springs and wherein the swinging bolster is supported directly from said springs and one which fulfills all requirements of manufacture and service.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a top plan view of the six wheel roller bearing truck embodying the invention;

Figure 2 is a side elevation of the six wheel truck construction illustrated in Figure 1;

Figure 3 is an end elevation of substantially one-half of the truck construction illustrated in Figure 1;

Figure 4 is a sectional end elevation of one-half of the truck structure illustrated in Figure 1, the same being taken substantially in the plane as indicated by the line 4—4 of Figure 2;

Figure 5 is an enlarged top plan view of the equalizer illustrated at the left of the truck shown in Figure 2;

Figure 6 is an enlarged side elevation of the equalizer shown in Figure 5;

Figure 7 is a transverse sectional elevation taken substantially in the plane indicated by line 7—7 of Figure 6;

Figure 8 is a transverse sectional elevation taken substantially in the plane indicated by line 8—8 of Figure 6;

Figure 9 is an enlarged top plan view of the equalizer illustrated at the right of the truck shown in Figure 2;

Figure 10 is an enlarged side elevation of the truck shown in Figure 9;

Figure 11 is a transverse sectional elevation taken substantially in the plane as indicated by the line 11—11 of Figure 10;

Figure 12 is a transverse sectional elevation taken substantially in the plane as indicated by the line 12—12 of Figure 10.

In general, it will be seen that in the construction shown, only four semi-elliptic springs are used, so disposed that the fulcrum equalizers are eliminated, and these springs may be of an increased length from 30% to 50% longer than the springs usually used in six wheel trucks having equalizer seats. By this arrangement, it will be appreciated that the spring deflection or vertical resiliency of the truck is increased as much as desired from substantially 30% to 60% more from that of the usual truck construction.

Referring particularly to the truck construction, the main truck frame 10 is preferably formed of a casting, being provided with longitudinally extending side sills or frame members 12 integrally connected by end frame members 14 and spaced transverse frame members or transoms 16, said truck frame being provided with suitable lugs 18 and 20 to accommodate the usual running gear, such as brake hangers and the like. Swing bolster 22 is provided with a center bearing 24 and spaced depending arms 26 at the ends thereof forming a substantially U-shaped member embracing the center axle construction, said arms being provided with bifurcated U-shaped member 28 for receiving one end of the hanger links 30 pivoted thereto as at 32, the other end of said links being pivotally mounted as at 34 to the respective transoms 16, the pivots 32 and 34 extending lengthwise of the truck whereby the bolster may swing transversely of said truck. The bolster members 26 are each provided with bearing surfaces 35 adapted to have bearing engagement with corresponding bearing surfaces 37 provided on the transverse frame members 16, said bearing surfaces being operative when the bolster has lateral movement with respect to the truck frame.

The bolster, adjacent the ends thereof, is provided with the side bearings 39, said side bearings being connected to the body portion of the bolster compression member by the web 41 reinforced by the laterally disposed spaced webs 43 extending to the center bearing. The web 45 merges into the side bearings 39 adjacent the center thereof and connects the side bearings to the bolster body portion, webs 41 and 45 being disposed longitudinally of the truck.

Three sets of anti-friction wheel and axle assemblies 36 are provided, such as illustrated in application Serial No. 182,734. In this construction, the inner normally stationary axle 38 extends through an outer revoluble axle 40, said axle being provided with the flared ends 42 providing a mounting for the hubs 44 of the wheels 46, said hubs being press fitted or shrunk on the enlarged portion 42 of the axle, a shoulder 48 being provided thereon for positioning said wheels. The flared portion 42 provides a lubricant recess for the anti-friction bearings 50, the outer race ring 52 of said bearings being mounted as by a press fit in the outer axle, the inner race ring 54 being mounted as by a press fit on the inner axle 38, the rollers 56 of the anti-friction bearing assemblies being of any type, such as the Timken or Shafer, and suitably caged.

The assembly is completed by a shrink ring or collar 58 mounted on the inner axle for positioning the inner race ring and a cap or cover plate 60 is secured to the outer axle as by the bolts 62 for closing the lubricant recess and for preventing the ingress of dirt or other foreign matter. The inner axle is provided with a bearing portion 64 upon which an axle bearer 66 is mounted, said bearer having the inner end portion 68 in position to cooperate with the shrink ring 58 to prevent movement thereof and having an outer depending lip 70 retained in a groove 72 formed in the end of the outer axle to prevent movement of said bearer along said axle. The bearer is provided with a central cylindrical surface 74 concentric with the surface of the bearing portion 64 and provided with flat surfaces 76 disposed on both sides of said central surface.

The side members 12 of the main truck frame are provided with spring seats 78 by which the vertical load from the main frame is carried directly on the top of the springs, the side walls 80 of the depending webs of the side frames adjacent the spring seats 78 serving as lateral positioning means.

The top web 81 of the side frame is provided with integrally formed spaced spring pads 83 forming the spring seats 78, said pads being adapted to engage the temporary wear plates 85 embracing the spring band 82 whereby adjustment of the truck height may readily be made at any time by removal of the pads or wear plates or addition of other wear plates. The spring band 82 serves as a retaining member for the semi-elliptic springs 84 which are of the leaf type and form a frustrum of a pyramid, the lower longer leaves being notched at each end to receive the spring clips 86 which serve to form a yoke around the leaves, said yokes being preferably riveted in place for the purpose of holding the leaves together so that when the springs are subjected to horizontal thrusts at the center band, the full length leaves will act together in transmitting this load to the equalizers on which the springs rest.

The spring clips 86 are provided with members having lower arcuate faces 88 retained in arcuate seats 90 and 91 formed on the equalizers 92 and 94 respectively adjacent the outer and inner ends thereof, the seats 90 and 91 being provided with side walls 93 having reenforcing pads 95 thereon whereby vertical loads and lateral thrusts are transmitted directly by the spring clips to the equalizers which in turn engage the axle bearers 66 to transmit these loads to the axles 38. It will thus be seen that maximum bearing area is maintained between the equalizers and springs for stress transmission through the parts of the truck assembly.

As shown in Figures 2, 6 and 10, the seats 90 are disposed outwardly of the vertical plane passing through the axis of the end axles, while the seats 91 are disposed between the axles and spaced from the adjacent center axle, and with this disposition of the seats, proper equalization of the loads is obtained on each of the axles. The leaf springs 84 are substantially flat whereby under deflection the effective length between the bearings is shortened so that the strength of the spring is greatest under the greatest load, while at the same time the bearing area between the spring seats and the bearings provided on the spring is maintained substantially constant. The equalizers are of substantially box-section for a greater portion of their length and are depressed intermediate the ends thereof whereby the substantially flat spring may be utilized, this section of equalizers making it possible to provide reenforcing brackets 97 in substantially vertical alignment with the intermediate seats 91.

The equalizers 92 and 94 are provided with end bearing faces 96 having cooperative guiding and abutting movement with corresponding faces 98 provided on the truck frame 10, said faces serving to receive extremely heavy longitudinal thrusts or shocks between the equalizers and the truck frame. The faces 96 and 98 are normally spaced apart an appreciable distance as normally the end thrust or drive from the side frame and leaf springs is transmitted directly through the faces or seats 88 to the seats 90 and thence through the equalizers to the wheel and axle assemblies. The equalizer 92 is provided with a forked or bifurcated center jaw having inverted U-shaped members 100 embracing the flat portions 76 of the bearer 66 so that the bearer may move with the equalizer. The other end of said equalizer is provided with an inverted U-shaped jaw 102 engaging the upper flat surfaces of its respective bearer whereby said bearer may move with said equalizer.

The end jaw 104 of the equalizer 94 is similar to the jaw 102 and cooperates with its respective bearer, and both jaws 102 and 104 are provided with some means, such as the bolts 106, by means of which the equalizers are held in assembly with the wheel and axle assemblies. The inner jaw 108 of the equalizer 94 is inverted U-shaped and fits within the bifurcated inner jaw members 100 of the equalizer 92 and is formed with a cylindrical surface engaging the cylindrical surface 74 of the bearer 66 whereby relative movement may be had between said bearer and the equalizer 94, and the jaws of the equalizer are so formed as to permit lateral angling between the assembly within certain limits without binding. The jaw 108 is provided with outwardly extending lugs 110 engaging in notches 111 in the equalizer jaw members 100 for the purpose of holding down the end of the equalizer 92 so that in case of derailment or accident, the parts of the assembly will not be misplaced. In this connection, the frame may be provided with frame end lugs 112 secured thereto as at 114 and so disposed with relation to the wheel and axle assemblies, and more particularly the bearing faces 96, as to prevent the lifting of the main frame from the wheel and axle assemblies when assemblied with the equalizers.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a six wheel truck, the combination of an integral truck frame including spaced longitudinal frame members, end cross members and spaced transverse frame members disposed between said end cross members, a center and end wheel and axle assemblies each including a fixed axle, a transversely and centrally disposed bolster having depending arms at the ends thereof, said arms extending on each side of said center wheel and axle assembly and below said transverse frame members, hanger links pivotally secured to said frame members and said arms whereby said bolster is swingably supported on said frame for transverse movement with respect thereto, equalizers disposed between said fixed axles, and resilient members disposed between said equalizers and said frame.

2. In a six wheel truck, the combination of an integral truck frame including spaced longitudinal frame members, end cross members and spaced transverse frame members disposed between said end cross members, a center and end wheel and axle assemblies each including projecting axle portions, a transversely and centrally disposed bolster having depending arms at the ends thereof, said arms extending on each side of said center wheel and axle assembly and below said transverse frame members, hanger links pivotally secured to said frame members and said arms whereby said bolster is swingably supported on said frame, bearing members mounted on said projecting axle portions, and equalizers disposed between said projecting axle portions, certain of said equalizers having spaced members disposed to embrace said bearing members.

3. In a six wheel truck, the combination of an integral truck frame including spaced longitudinal frame members, end cross members and spaced transverse frame members disposed between said end cross members, a center and end wheel and axle assemblies each including projecting axle portions, a transversely and centrally disposed bolster having depending arms at the ends thereof, said arms extending on each side of said center wheel and axle assembly and below said transverse frame members, hanger links pivotally secured to said frame members and said arms whereby said bolster is swingably supported on said frame, bearing members mounted on said projecting axle portions, and equalizers disposed between said projecting axle portions, certain of said equalizers having spaced members disposed to embrace said bearing members, said equalizers being mounted for relative movement on the center wheel and axle assembly.

4. In a six wheel truck, the combination of an integral truck frame including spaced longitudinal frame members, end cross members and spaced transverse frame members disposed between said end cross members, a center and end wheel and axle assemblies each including projecting axle portions, a transversely and centrally disposed bolster having depending arms at the ends thereof, said arms extending on each side of said center wheel and axle assembly and below said transverse frame members, hanger links pivotally secured to said frame members and said arms whereby said bolster is swingably supported on said frame, bearing members mounted on said projecting axle portions, and equalizers disposed between said projecting axle portions in cooperative relation with said bearing members, said equalizers being mounted for relative movement on the center wheel and axle assembly, one of said equalizers being mounted to move with the bearing member thereof and another of said equalizers being movably mounted with respect to said bearing member.

5. In a six wheeled truck, the combination of a truck frame including spaced longitudinal frame members and spaced transverse frame members, wheel and axle assemblies cooperating with said truck frame, equalizers disposed between said assemblies, resilient means engaging said frame and cooperating with said equalizers, and cooperating bearings between said means and equalizers disposed in pockets in said equalizers whereby stresses are transmitted from said frame to said wheel and axle assemblies through said resilient means in a plurality of directions.

6. In a truck, the combination of a truck frame including spaced longitudinal frame members and spaced transverse frame members, wheel and axle assemblies cooperating with said truck frame, equalizers disposed between said assemblies, resilient means on said frame cooperating with said equalizers, and cooperating bearings between said means and equalizers whereby maximum bearing area is maintained between said means and equalizers, said resilient means being adapted to transmit end thrust to said equalizers through said bearings.

7. In an equalizing arrangement, the combination of wheel and axle assemblies, equalizers disposed between said assemblies, one of said equalizers having means thereon cooperating with a portion of another of said equalizers for maintaining said last named equalizer in cooperative relation to said assemblies, said means including a flange on one of the equalizers overlapping a portion of the other equalizer.

8. In an equalizing arrangement, the combination of wheel and axle assemblies, including fixed and rotary axles, bearings disposed on said fixed axles, equalizers disposed between said bearings, one of said equalizers having a portion embracing a portion of another of said equalizers, one of said equalizers being adapted to move with said bearings, and the other of said equalizers cooperating with a plurality of said bearings and adapted to have relative movement with respect to one of said bearings.

9. In an equalizing arrangement, the combination of wheel and axle assemblies, including fixed and rotary axles, bearings disposed on said fixed axles, equalizers disposed between said bearings, pairs of said equalizers having a common bearing, one of said equalizers having a portion embracing a portion of another of said equalizers at said common bearing, one of said equalizers being adapted to move with said bearings, and the other of said equalizers cooperating with a plurality of said bearings and adapted to have relative movement with respect to said common bearing.

10. In an equalizing arrangement, the combination of wheel and axle assemblies, including fixed and rotary axles, bearings disposed on said fixed axles, equalizers disposed between said bearings, pairs of said equalizers having a common bearing, one of said equalizers having a portion embracing a portion of another of said equalizers at said common bearing, one of said equalizers being adapted to move with said bearings, the other of said equalizers cooperating with a plurality of said bearings and adapted to have relative movement with respect to said common bearing, and means on one of said equalizers cooperating with another of said equalizers for maintaining said last named equalizer in cooperative relation to said assemblies.

11. In an equalizer, the combination of a body portion, axle cooperating members at the ends thereof, and a substantially concave spring seat formed in said body portion, said body portion having thrust receiving and transmitting walls disposed adjacent said seat.

12. In an equalizer, the combination of a body portion, axle cooperating members at the ends thereof, and a substantially concave spring seat formed in said body portion substantially above one of said axle cooperating members, said body portion having thrust receiving and transmitting walls disposed adjacent said seat.

13. In a six wheeled truck, the combination of a pair of spaced side frames, transoms connecting said side frames, a bolster swingably mounted on said transoms, spaced wheels and axles, said axles having a journal portion disposed in the plane of said side frames, equalizers extending between said axles and interengaging at one of said axles, said equalizers having axle embracing pedestals, and a resilient member between one of said equalizers and one of said side frames.

14. In a truck, the combination of a pair of spaced side frames, transoms connecting said side frames, a bolster swingably mounted on said transoms, spaced wheels and axles, said axles having a journal portion disposed in the plane of said side frames, equalizers extending between said axles, said equalizers having axle embracing pedestals, a resilient member between one of said equalizers and one of said side frames normally accommodating driving thrusts therebetween, and cooperating abutment means interposed between said resilient member and side frame at each end of said truck and spaced under all conditions of normal operation of said truck.

15. In a truck, the combination of a pair of spaced side frames, transoms connecting said side frames, a bolster swingably mounted on said transoms, spaced wheels and axles disposed at the center and adjacent the ends of said truck, said axles having a journal portion disposed in the plane of said side frames, equalizers extending between said axles, said equalizers having axle embracing pedestals adjacent the ends of said truck, one of said equalizers having an axle embracing pedestal cooperating with said center axle, another of said equalizers cooperating with the aforementioned equalizer, each of said equalizers having spaced spring seats, and springs slidingly cooperating with said seats and supporting said side frames.

16. In a truck, the combination of a pair of spaced side frames, transoms connecting said side frames, a bolster swingably mounted on said transoms, spaced wheels and axles disposed at the center and adjacent the ends of said truck, said axles each having a journal portion disposed in the plane of said side frames, equalizers extending between said axles, said equalizers having axle embracing pedestals adjacent the ends of said truck, one of said equalizers having an axle embracing pedestal cooperating with said center axle, another of said equalizers cooperating with the aforementioned equalizer, each of said equalizers having spaced spring seats, springs slidingly cooperating with said seats and supporting said side frames, and cooperating abutment means on said equalizers and side frames.

17. In a six-wheeled truck, the combination of a truck frame including spaced longitudinal frame members and spaced transverse frame members, wheel and axle assemblies cooperating with said truck frame, equalizing members disposed between said assemblies, resilient means on said equalizers cooperating with said frame, and cooperating bearings between said means and equalizers and arranged so that said resilient means transmits vertical loads and end thrust.

18. An equalizer for a car truck including a body portion having spaced jaws adjacent each end thereof for receiving journals of wheel and axle assemblies, said body portion being provided with spaced spring seats, one of said seats being disposed above one pair of said jaws, and the other of said seats being disposed intermediate the pairs of spaced jaws.

19. An equalizer for a car truck including a body portion having spaced jaws adjacent one end thereof for receiving a journal of a wheel and axle assembly, a bifurcated member adjacent the other end having a bearing portion for accommodating the journal of a wheel and axle assembly, said body portion being provided with spaced spring seats, one of said seats being disposed substantially above said spaced jaws, and the other of said seats being spaced between said jaws and said bifurcated end.

20. An equalizer for a car truck including a body portion having spaced jaws adjacent one end thereof for receiving a journal of a wheel and axle assembly, a bifurcated member adjacent the other end having a bearing portion for accommodating the journal of a wheel and axle assembly, said body portion being provided with spaced spring seats, one of said seats being disposed substantially above one of the journals, and the other of said seats being spaced between said journals.

21. In a side frame, the combination of a beam member provided with a spring seat, said seat including integral spaced pads adapted for partial or total destruction to effect side frame adjustment.

22. In a truck, the combination of a truck frame, spaced wheel and axle assemblies supporting said frame, resilient means supporting said frame, a seat on said frame for engagement with said resilient means, said seat including an integral pad adapted for partial or total destruction to effect adjustment of said frame with respect to said wheel and axle assemblies.

23. In a truck, the combination of a truck frame, spaced wheel and axle assemblies supporting said frame, resilient means supporting said frame, a seat on said frame for engagement with said resilient means, said seat including an integral pad adapted for partial or total destruction to effect adjustment of said frame with respect to said wheel and axle assemblies, and a wear pad interposed between said resilient means and seat for further adjustment of said frame.

24. In a truck, the combination of spaced wheel and axle assemblies, beam members relatively movable with respect to each other and disposed between and cooperating with the journal ends of said wheel and axle assemblies, a load carrying member spaced therefrom, and resilient means supporting said load carrying member on said beam member for resiliently transmitting vertical loads to said beam member, said resilient means being adapted to transmit loads longitudinally and laterally of the truck from one of said members to the other of said members through the ends thereof.

25. In a truck, the combination of spaced wheel and axle assemblies, beam members disposed between and cooperating with the journal ends of said wheel and axle assemblies, a load carrying member spaced therefrom, and resilient means supporting said load carrying member on said beam members for resiliently transmitting vertical loads to said beam members, said resilient means being adapted to transmit loads longitudinally and laterally of the truck from one of said members to another of said members, said beam members and said load carrying member being provided with means normally spaced apart but adapted to have cooperative relation with each other for transmitting sudden longitudinal shocks from one of said members to another of said members.

26. In a truck, the combination of spaced wheel and axle assemblies, beam members relatively movable with respect to each other and disposed between and cooperating with the journal ends of said wheel and axle assemblies, a load carrying member spaced therefrom, and having spaced spring seats thereon, and a semi-elliptic spring engaged by one of said seats and supporting said load carrying member on one of said beam members for resiliently transmitting vertical loads to said beam member, said spring being adapted to transmit loads longitudinally and laterally of the truck from one of said members to the other of said members through the ends thereof.

27. In a truck, the combination of spaced wheel and axle assemblies, beam members disposed between and cooperating with the journal ends of said wheel and axle assemblies, a load carrying member spaced therefrom and having spaced spring seats thereon, and a semi-elliptic spring engaged by one of said seats and supporting said load carrying member on a beam member for resiliently transmitting vertical loads to said beam member, said spring being adapted to transmit loads longitudinally and laterally of the truck from one of said members to the other of said members, said beam member and said load carrying member being provided with means normally spaced apart but adapted to have cooperative relation with each other for transmitting sudden longitudinal shocks from one of said members to the other of said members.

28. In a truck, the combination of wheel and axle assemblies having journal means, a rigid member disposed between said wheel and axle assemblies and directly supported on said journal means, a longitudinally disposed leaf spring supported on said rigid member, the leaves of said leaf spring as loaded and assembled being substantially flat whereby the effective length of said spring is lessened upon deflection thereof, the ends of said leaf spring engaging said rigid member whereby stresses are transmitted to said rigid member from the ends of said leaf spring in a plurality of directions one of which is in a driving direction.

29. In a truck, the combination of wheel and axle assemblies having journal means, a rigid member disposed between said wheel and axle assemblies and directly supported on said journal means, a longitudinally disposed leaf spring unconfined intermediate the ends thereof with respect to said rigid member and supported on said rigid member, the leaves of said leaf spring as loaded and assembled being substantially flat whereby the effective length of said spring is lessened upon deflection thereof, the ends of said leaf spring engaging said rigid member whereby stresses are transmitted to said rigid member from the ends of said leaf spring in a plurality of directions one of which is in a driving direction.

30. In a six-wheeled truck, the combination of a truck frame including spaced longitudinal frame members and spaced transverse frame members, wheel and axle assemblies cooperating with said truck frame, equalizers disposed between said assemblies, and resilient means engaging said frame and cooperating with said equalizers, said resilient means including leaf springs, one end of said springs being substantially above certain of the axles, and the other end of said springs being spaced from another of said axles, the construction and arrangement being such that the load is transmitted substantially in the same amount to each of said axles.

31. In a six-wheeled truck, the combination of a truck frame including spaced longitudinal frame members and spaced transverse frame members, wheel and axle assemblies cooperating with said truck frame, equalizers disposed between said assemblies, and resilient means engaging said frame and cooperating with said equalizers, said resilient means including leaf springs, one end of said springs being substantially above the end of said axles, and the other end of said springs being spaced from the center of said axles, the construction and arrangement being such that the load is transmitted substantially in the same amount to each of said axles.

32. In a six-wheeled truck, the combination of a pair of spaced side frames, transoms connecting said side frames, a bolster swingably mounted on said transoms, spaced wheels and axles, said axles having a journal portion disposed in the plane of said side frames, equalizers extending between said axles and interengaging at one of said axles, said equalizers having axle embracing pedestals, and resilient means so disposed between each of said equalizers and said frames that the load is transmitted substantially in the same amount to each of said axles.

33. In a six-wheeled truck, the combination of a pair of spaced side frames, transoms connecting said side frames, a bolster swingably mounted on said transoms, spaced wheels and axles, said axles having a journal portion disposed in the plane of said side frames, equalizers extending between said axles and interengaging at one of said axles, said equalizers having axle embracing pedestals, and resilient means between each of said equalizers and said frames, said resilient means including leaf springs, one end of said springs being substantially above the end of said axles, and the other end of said springs being spaced from the center of said axles, the construction and arrangement being such that the load is transmitted substantially in the same amount to each of said axles.

34. In a truck, the combination of a truck frame including spaced longitudinal frame members and spaced transverse frame members, wheel and axle assemblies cooperating with said truck frame, equalizers disposed between said assemblies, resilient means on said frame cooperating with said equalizers, and cooperating bearings between said means and equalizers whereby maximum bearing area is maintained between said means and equalizers, said resilient means being adapted to transmit end thrust to said equalizers through said bearings, said resilient means including leaf springs, one end of said springs being substantially above certain of the axles, and the other end of said springs being spaced from another of said axles, the construction and arrangement being such that the load is transmitted substantially in the same amount to each of said axles.

35. In a truck, the combination of a truck frame including spaced longitudinal frame members and spaced transverse frame members, wheel and axle assemblies cooperating with said truck frame, equalizers disposed between said assemblies, resilient means on said frame cooperating with said equalizers, and cooperating bearings between said means and equalizers whereby maximum bearing area is maintained between said means and equalizers, said resilient means being adapted to transmit end thrust to said equalizers through said bearings, said resilient means including leaf springs, one end of said springs being substantially above the end of said axles, and the other end of said springs being spaced from the center of said axles, the construction and arrangement being such that the load is transmitted substantially in the same amount to each of said axles.

36. In a truck, the combination of a truck frame including spaced side frames, spaced wheel and axle assemblies disposed at the ends and adjacent the transverse center line of said truck, equalizers between each of said end wheel and axle assemblies and center wheel and axle assembly, leaf springs disposed between said side frames and each of said equalizers, said springs being disposed so that one of the ends is substantially above the end axles, and the other end is spaced from the center of said axles, the construction and arrangement being such that the load is supported substantially equally by said wheel and axle assemblies.

37. In a truck, the combination of a truck frame including spaced side frames, spaced wheel and axle assemblies disposed at the ends and adjacent the transverse center line of said truck, equalizers between each of said end wheel and axle assemblies and center wheel and axle assembly, substantially flat leaf springs disposed between said side frames and each of said equalizers, said springs being disposed so that one of the ends is substantially above the end axles, and the other end is spaced from the center of said axles, the construction and arrangement being such that the load is supported substantially equally by said wheel and axle assemblies.

38. In a truck, a main frame, wheel and axle assemblies, equalizers disposed between said wheel and axle assemblies, and semi-elliptic springs supporting said main frame on said equalizers, the construction and arrangement being such that vertical and lateral thrusts are transmitted from said main frame to said wheel and axle assemblies solely through said springs and equalizers.

39. In a truck, a main frame, wheel and axle assemblies, equalizers disposed between said wheel and axle assemblies, leaf springs supporting said main frame at points intermediate their ends and supported on said equalizers at their ends, the construction and arrangement being such that vertical loads and lateral thrusts to be transmitted ultimately between said wheel and axle assemblies and said frame are transmitted entirely through said springs between said main frame and said equalizers.

40. In a six wheel truck, a load-carrying member, wheel and axle assemblies, equalizing members connecting said wheel and axle assemblies, semi-elliptic springs supported at their ends on said equalizing members and supporting said load-carrying member at points intermediate their ends, the construction and arrangement being such that said equalizing members are free of lateral thrusts to be transmitted ultimately between said load-carrying member and said wheel and axle assemblies except as transmitted through said springs.

41. In a railway truck, a load-carrying member, a wheel and axle assembly, an equalizing system including a wheel piece and a semi-elliptic spring supported thereon, said semi-elliptic spring having a band intermediate its ends, said band forming means through which all vertical and lateral thrusts are transmitted from said load-carrying member to said wheel and axle assembly.

42. In a railway truck having a main frame and an equalizing system, said equalizing system including a semi-elliptic spring having a band, said band being so constructed and arranged as to form the fulcrum point of said equalizing system and acting as means for transmitting vertical, lateral, and normal longitudinal thrusts to be transmitted ultimately between said wheel and axle assemblies and said frame from said main frame to said equalizing system.

43. In a railway truck, a main frame, an equalizing system including an equalizer and a semi-elliptic spring having a band, said band forming the fulcrum point for transmitting normal loads and thrusts between said main frame and said equalizing system, an inwardly facing bearing on said main frame and an outwardly facing bearing on said equalizer, said bearings being oppositely disposed and normally spaced for transmitting abnormal longitudinal thrusts.

44. In a railway truck, a main frame, end and middle wheel and axle assemblies, equalizers connecting said wheel and axle assemblies, semi-elliptic springs supporting said main frame on said equalizers, the construction and arrangement being such that lateral movement between said equalizers and frame with relation to said main frame is limited solely by said semi-elliptic springs.

45. In a railway truck, a side frame, wheel and axle assemblies, equalizers connecting said wheel and axle assemblies, and semi-elliptic springs being so constructed and arranged with respect to said side frame and said equalizers that all lateral thrusts to be transmitted ultimately between said side frame and wheel and axle assemblies are transmitted though said springs between said side frame and equalizers.

46. In a railway truck, a load-carrying member, wheel and axle assemblies, equalizers connecting said wheel and axle assemblies, and semi-elliptic springs being so constructed and arranged with respect to said load-carrying member and said equalizers that all lateral thrusts to be transmitted ultimately between said side frame and wheel and axle assemblies are transmitted through said springs, said load carrying member and said equalizers being so constructed and arranged that all normal rubbing contacts are eliminated between said load-carrying member and said equalizers.

47. In a truck, a main frame, wheel and axle assemblies, equalizers connecting said wheel and axle assemblies, semi-elliptic springs supported on said equalizers and supporting said main frame, each of said equalizers with its associated semi-elliptic spring being so constructed and arranged as to form an equalizing system, a spring band intermediate the ends of each semi-elliptic spring, and said spring bands forming the fulcrum points of their respective equalizing systems, the ends of said leaf springs being spaced longitudinally from one of the adjacent axles.

48. In a truck having a main frame, wheel and axle assemblies, equalizers supported on the ends of said axles and interlocking over the middle axle, a semi-elliptic spring having a band associated with each equalizer to form an equalizing system, spaced pockets in each equalizer receiving the ends of its associated semi-elliptic spring, and spaced pockets in said main frame receiving said spring bands, said pockets being the sole means of transmitting vertical and lateral forces from said main frame through said equalizing systems to said wheel and axle assembly.

49. In a six wheel truck, the combination of a main frame, spaced wheel and axle assemblies, and a semi-elliptic leaf spring supporting said main frame on said wheel and axle assemblies and so constructed and arranged with respect thereto that it serves as the sole means of transmitting lateral forces between said frame and wheel and axle assemblies.

ALFRED H. OELKERS.